US012625974B2

(12) United States Patent
Meng et al.

(10) Patent No.: US 12,625,974 B2
(45) Date of Patent: May 12, 2026

(54) CONTEXT-AWARE FINE-GRAINED DEVICE ACCESS CONTROL FOR A VEHICLE

(71) Applicant: International Business Machines Corporation, Armonk, NY (US)

(72) Inventors: Fan Jing Meng, Beijing (CN); Jing Yan Zhang, Beijing (CN); Yuan Yuan, Beijing (CN); Jia Liu, Beijing (CN); Ziyue Yang, Guangzhou (CN)

(73) Assignee: International Business Machines Corporation, Armonk, NY (US)

( * ) Notice: Subject to any disclaimer, the term of this patent is extended or adjusted under 35 U.S.C. 154(b) by 57 days.

(21) Appl. No.: 18/610,427

(22) Filed: Mar. 20, 2024

(65) Prior Publication Data

US 2025/0298907 A1 Sep. 25, 2025

(51) Int. Cl.
| | |
|---|---|
| *G06F 21/60* | (2013.01) |
| *G06V 20/59* | (2022.01) |
| *G06V 40/16* | (2022.01) |

(52) U.S. Cl.
CPC .............. *G06F 21/60* (2013.01); *G06V 20/59* (2022.01); *G06V 40/16* (2022.01)

(58) Field of Classification Search
None
See application file for complete search history.

(56) References Cited

U.S. PATENT DOCUMENTS

| | | |
|---|---|---|
| 9,398,421 B2 | 7/2016 | Guba et al. |
| 10,231,125 B2 | 3/2019 | Spaur et al. |

| | | | |
|---|---|---|---|
| 11,178,272 B2 | 11/2021 | Breaux et al. | |
| 2011/0093153 A1* | 4/2011 | Moinzadeh | H04M 1/724098 |
| | | | 701/31.4 |
| 2018/0284765 A1* | 10/2018 | Brouwer | H04W 12/61 |
| 2019/0377381 A1 | 12/2019 | Tuttle | |
| 2020/0388091 A1* | 12/2020 | Ropel | H04L 9/0637 |
| 2021/0256248 A1* | 8/2021 | Nagata | B60K 28/04 |

(Continued)

OTHER PUBLICATIONS

Ashutosh et al., "XACML for Mobility (XACML4M)—An Access Control Framework for Connected Vehicles," Sensors 2023, 23, 1763, Feb. 4, 2023, pp. 1-33.

(Continued)

*Primary Examiner* — Raqiul A Choudhury
(74) *Attorney, Agent, or Firm* — CANTOR COLBURN LLP; Joseph P. Curcuru

(57) ABSTRACT

Context-aware fine-grained device access control for a vehicle is provided. Aspects include receiving an access request from an application installed on the vehicle, obtaining one or more operating characteristics of the vehicle, and inputting the access request and the one or more operating characteristics of the vehicle into an access control model. Aspects also include granting the access request to the application based on one of receiving a grant access request from the access control model and receiving an approval of the access request from the operator of the vehicle. Based on one of receiving a deny access request from the access control model and receiving the denial of the access request from the operator of the vehicle, aspects include denying the access request to the application. The access request includes an identifier of the application and an identifier of a type of access being requested by the application.

15 Claims, 5 Drawing Sheets

(56)  References Cited

U.S. PATENT DOCUMENTS

| | | | | |
|---|---|---|---|---|
| 2021/0403004 | A1 * | 12/2021 | Alvarez | ................ G06F 18/214 |
| 2022/0063573 | A1 * | 3/2022 | Murphy | ................ G08G 1/166 |
| 2022/0078556 | A1 | 3/2022 | Stachura | |
| 2023/0061842 | A1 | 3/2023 | Gibson et al. | |

OTHER PUBLICATIONS

Chukkapalli et al., "CAPD: A Context-Aware, Policy-Driven Framework for Secure and Resilient IoBT Operations," arXiv:2208-01703v1 [cs.CR] Aug. 2, 2022, 10 pages.

Gupta, "Secure Cloud Assisted Smart Cars Using Dynamic Groups and Attribute Based Access Control," arXiv:1908.08112v1 [cs.CR] Aug. 21, 2019, pp. 1-24.

Han et al., "A Smart Framework for Fine-Grained Microphone Acoustic Permission Management," IEEE Transactions on Dependable and Secure Computing, vol. 18, No. 6, Nov./Dec. 2021, pp. 2705-2718.

Zhang, "Interactive based Access Control Framework for Connected Vehicle Communication," IEEE 14th International Conference on Control and Automation (ICCA), Jun. 12-15, 2018, pp. 393-398.

Zhong et al., "A New Message Authentication Scheme for Multiple Devices in Intelligent Connected Vehicles Based on Edge Computing," IEEE Access, Special Section on Urban Computing and Intelligence, vol. 7, 2019, pp. 108211-108222.

* cited by examiner

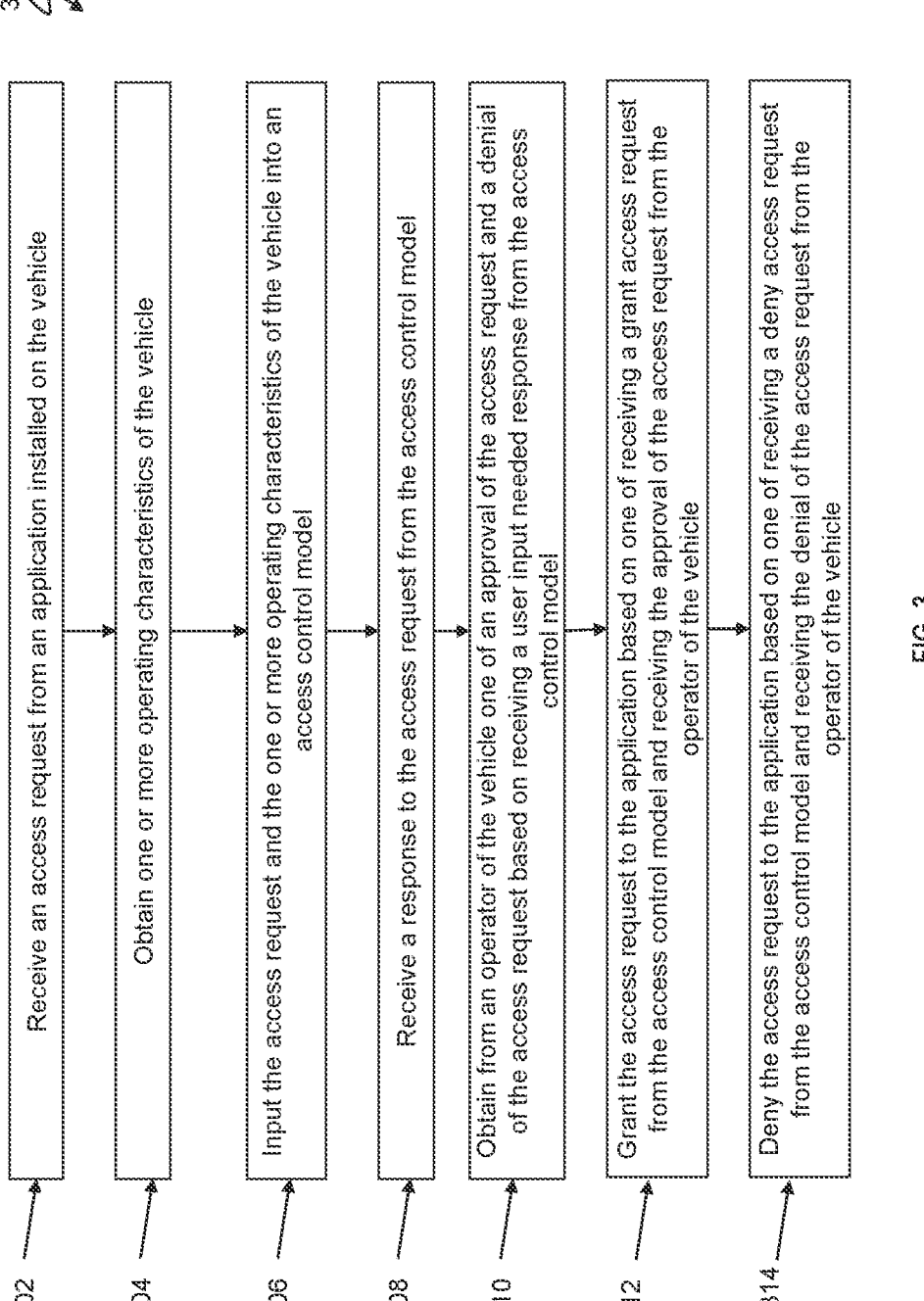

300

302 — Receive an access request from an application installed on the vehicle

304 — Obtain one or more operating characteristics of the vehicle

306 — Input the access request and the one or more operating characteristics of the vehicle into an access control model 308 — Receive a response to the access request from the access control model 310 — Obtain from an operator of the vehicle one of an approval of the access request and a denial of the access request based on receiving a user input needed response from the access control model 312 — Grant the access request to the application based on one of receiving a grant access request from the access control model and receiving the approval of the access request from the operator of the vehicle 314 — Deny the access request to the application based on one of receiving a deny access request from the access control model and receiving the denial of the access request from the operator of the vehicle

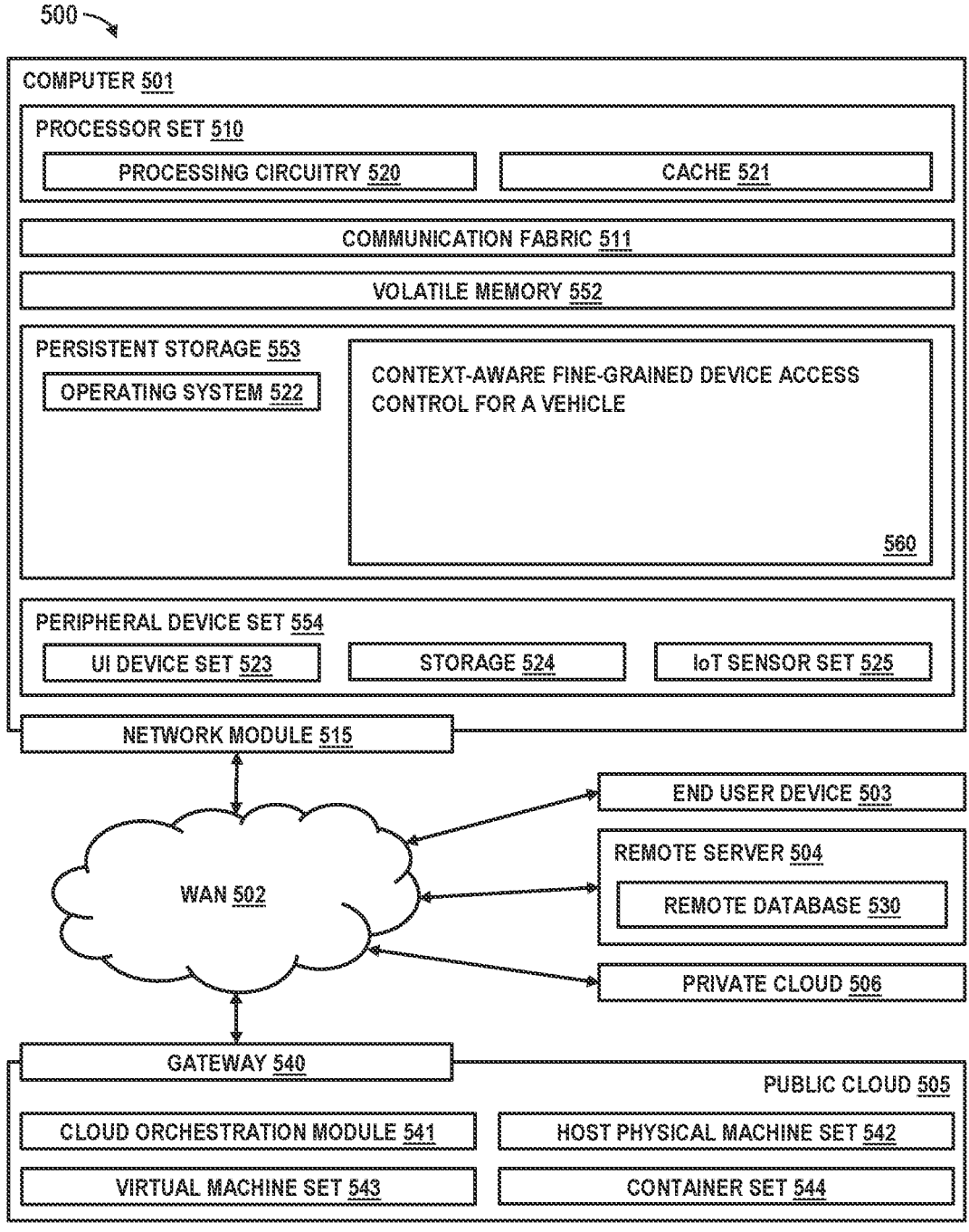

COMPUTER 501

PROCESSOR SET 510

PROCESSING CIRCUITRY 520         CACHE 521

COMMUNICATION FABRIC 511

VOLATILE MEMORY 552

PERSISTENT STORAGE 553

OPERATING SYSTEM 522

CONTEXT-AWARE FINE-GRAINED DEVICE ACCESS CONTROL FOR A VEHICLE

560

PERIPHERAL DEVICE SET 554

UI DEVICE SET 523         STORAGE 524         IoT SENSOR SET 525

NETWORK MODULE 515

WAN 502

END USER DEVICE 503

REMOTE SERVER 504

REMOTE DATABASE 530

PRIVATE CLOUD 506

GATEWAY 540

PUBLIC CLOUD 505

CLOUD ORCHESTRATION MODULE 541         HOST PHYSICAL MACHINE SET 542

VIRTUAL MACHINE SET 543         CONTAINER SET 544

FIG. 5

CONTEXT-AWARE FINE-GRAINED DEVICE ACCESS CONTROL FOR A VEHICLE

BACKGROUND

Aspects of the present invention generally relate to controlling access to data in a vehicle and, more specifically, to methods for context-aware fine-grained device access control for a vehicle.

With the advancement of technology, the number of ways of obtaining the private personal data of an individual is becoming more extensive and is no longer limited to computers, cell phones, tablets, and other terminals. Modern vehicles are equipped with advanced processing systems that often allow users to install various third-party applications (i.e., applications not developed by the manufacturer of the vehicle) on the vehicle. In addition, modern vehicles are often equipped with a wide variety of sensors, such as microphones and cameras, that can be used to obtain private personal data of individuals within the vehicle. As a result, vehicles have become a potential source of private personal data.

Currently, modern vehicles are not equipped with systems for controlling the access to the various sensors of the vehicle by third-party applications installed on the vehicle processing system.

SUMMARY

Embodiments of the present disclosure are directed to computer-implemented methods for context-aware fine-grained device access control for a vehicle. According to an aspect, a computer-implemented method includes receiving an access request from an application installed on a vehicle, obtaining one or more operating characteristics of the vehicle, and inputting the access request and the one or more operating characteristics of the vehicle into an access control model. Based on receiving a user input needed response from the access control model, the method includes obtaining from an operator of the vehicle one of an approval of the access request and a denial of the access request. Based on one of receiving a grant access request from the access control model and receiving the approval of the access request from the operator of the vehicle, the method includes granting the access request to the application. Based on one of receiving a deny access request from the access control model and receiving the denial of the access request from the operator of the vehicle, the method includes denying the access request to the application. The access request includes an identifier of the application and an identifier of a type of access being requested by the application.

According to another non-limiting embodiment of the disclosure, a system having a memory having computer-readable instructions and one or more processors for executing the computer-readable instructions, the computer-readable instructions controlling the one or more processors to perform operations. The operations include receiving an access request from an application installed on a vehicle, obtaining one or more operating characteristics of the vehicle, and inputting the access request and the one or more operating characteristics of the vehicle into an access control model. Based on receiving a user input needed response from the access control model, the operations include obtaining from an operator of the vehicle one of an approval of the access request and a denial of the access request. Based on one of receiving a grant access request from the access request from the operator of the vehicle, the operations include granting the access request to the application. Based on one of receiving a deny access request from the access control model and receiving the denial of the access request from the operator of the vehicle, the operations include denying the access request to the application. The access request includes an identifier of the application and an identifier of a type of access being requested by the application.

According to another non-limiting embodiment of the disclosure, a computer program product for estimating workload energy consumption is provided. The computer program product includes a computer-readable storage medium having program instructions embodied therewith, the program instructions executable by a processor to cause the processor to perform operations. The operations include receiving an access request from an application installed on a vehicle, obtaining one or more operating characteristics of the vehicle, and inputting the access request and the one or more operating characteristics of the vehicle into an access control model. Based on receiving a user input needed response from the access control model, the operations include obtaining from an operator of the vehicle one of an approval of the access request and a denial of the access request. Based on one of receiving a grant access request from the access control model and receiving the approval of the access request from the operator of the vehicle, the operations include granting the access request to the application. Based on one of receiving a deny access request from the access control model and receiving the denial of the access request from the operator of the vehicle, the operations include denying the access request to the application. The access request includes an identifier of the application and an identifier of a type of access being requested by the application.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the present disclosure are apparent from the following detailed description taken in conjunction with the accompanying drawings in which:

FIG. 3 illustrates a flow chart diagram of a method for context-aware fine-grained device access control for a vehicle in accordance with an embodiment of the present invention;

FIG. 5 depicts details of an exemplary computing environment operable to implement various aspects of the invention.

DETAILED DESCRIPTION

Figure 1:
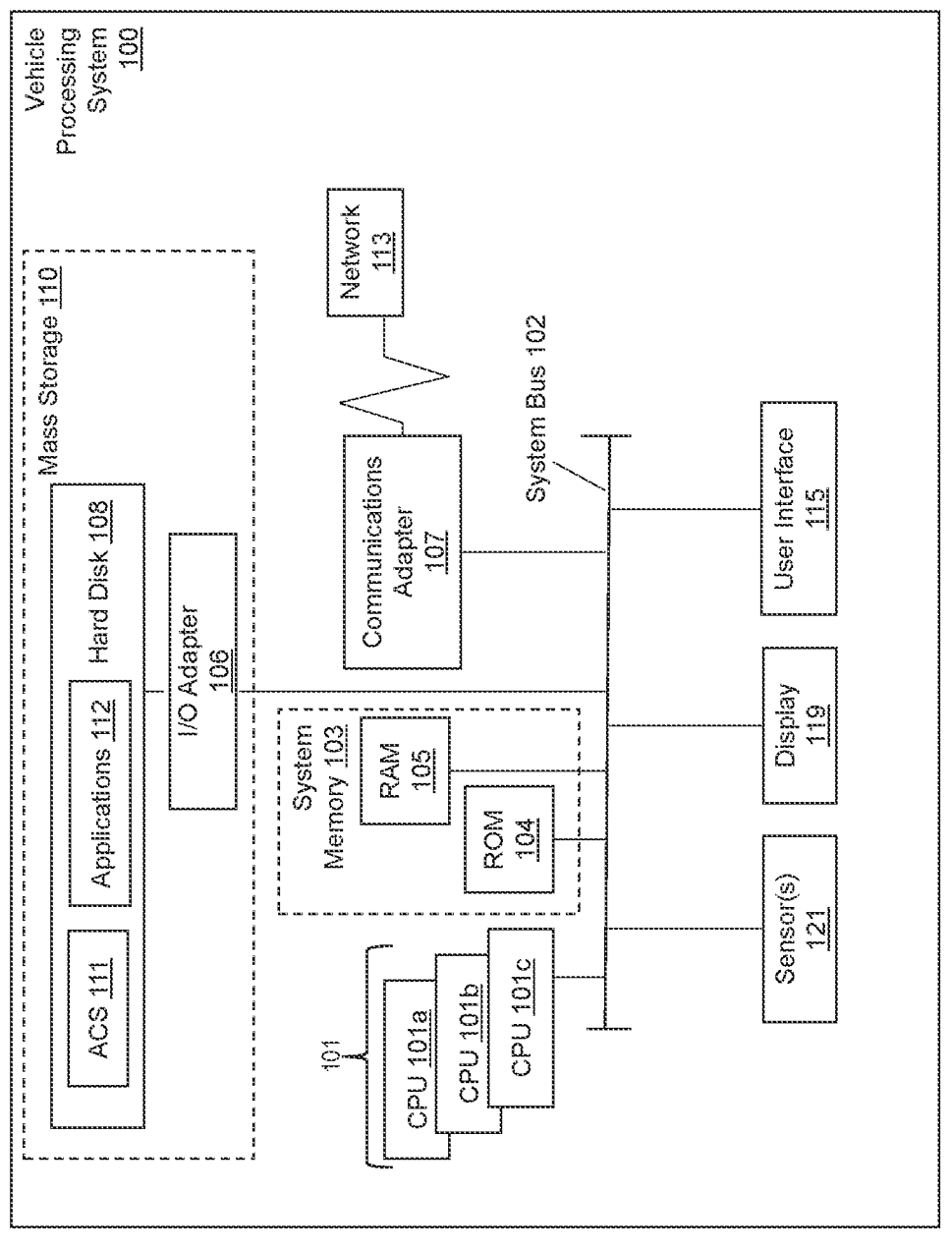
FIG. 1 illustrates a block diagram of a vehicle processing system in accordance with one or more embodiments of the present invention.

Embodiments of the present disclosure are directed to computer-implemented methods for context-aware fine-grained device access control for a vehicle. According to an aspect, a computer-implemented method includes receiving an access request from an application installed on a vehicle, obtaining one or more operating characteristics of the vehicle, and inputting the access request and the one or more operating characteristics of the vehicle into an access control model. Based on receiving a user input needed response from the access control model, the method includes obtaining from an operator of the vehicle one of an approval of the access request and a denial of the access request. Based on one of receiving a grant access request from the access control model and receiving the approval of the access request from the operator of the vehicle, the method includes granting the access request to the application. Based on one of receiving a deny access request from the access control model and receiving the denial of the access request from the operator of the vehicle, the method includes denying the access request to the application. The access request includes an identifier of the application and an identifier of a type of access being requested by the application. Technical benefits of providing context-aware fine-grained device access control for a vehicle include protecting the personal private data of occupants of a vehicle and facilitating the customization of the privacy settings for the vehicle.

In exemplary embodiments, the operator of the vehicle is identified and wherein the access control model corresponds to the operator of the vehicle. Technical benefits of identifying the operator of the vehicle and applying an access control model corresponds to the operator of the vehicle include allowing a vehicle to automatically select and apply a proper one of multiple access control models stored in the vehicle.

In exemplary embodiments, the operator of the vehicle is identified based on one of a facial recognition of the operator, a determination that a mobile device associated is located within the vehicle, and a determination that a key associated is located within the vehicle. Technical benefits of identifying the operator of the vehicle and applying an access control model corresponds to the operator of the vehicle include allowing a vehicle to automatically select and apply a proper one of multiple access control models stored in the vehicle.

In exemplary embodiments, the access control model is updated based on receiving the one of the approval of the access request and the denial of the access request. Technical benefits of updating the access control model based on user approvals or denials of access requests include allowing the vehicle to learn and adapt the access control model overtime.

In exemplary embodiments, the updated access control model is stored on one or more of a memory disposed in the vehicle and a mobile device associated with the operator. Technical benefits of storing the updated access control model on one or more of a memory disposed in the vehicle and a mobile device associated with the operator include allowing an operator to deploy an personalized access control model in a vehicle the operator may not previously used.

In exemplary embodiments, the one or more operating characteristics of the vehicle include an operating speed of the vehicle, a location of the vehicle, and a number of occupants of the vehicle. Technical benefits of using the operating speed of the vehicle, a location of the vehicle, and a number of occupants of the vehicle as inputs to the access control model include allowing the access control model to provide context aware privacy controls.

In exemplary embodiments, the type of access is one of a microphone access, a camera access, a speedometer access, a location access, and a data access. Technical benefits of limiting access to microphones, cameras, speedometer readings, and the location of the vehicle include protecting the personal private data of occupants of a.

According to another non-limiting embodiment of the disclosure, a system having a memory having computer-readable instructions and one or more processors for executing the computer-readable instructions, the computer-readable instructions controlling the one or more processors to perform operations. The operations include receiving an access request from an application installed on a vehicle, obtaining one or more operating characteristics of the vehicle, and inputting the access request and the one or more operating characteristics of the vehicle into an access control model. Based on receiving a user input needed response from the access control model, the operations include obtaining from an operator of the vehicle one of an approval of the access request and a denial of the access request. Based on one of receiving a grant access request from the access control model and receiving the approval of the access request from the operator of the vehicle, the operations include granting the access request to the application. Based on one of receiving a deny access request from the access control model and receiving the denial of the access request from the operator of the vehicle, the operations include denying the access request to the application. The access request includes an identifier of the application and an identifier of a type of access being requested by the application.

According to another non-limiting embodiment of the disclosure, a computer program product for estimating workload energy consumption is provided. The computer program product includes a computer-readable storage medium having program instructions embodied therewith, the program instructions executable by a processor to cause the processor to perform operations. The operations include receiving an access request from an application installed on a vehicle, obtaining one or more operating characteristics of the vehicle, and inputting the access request and the one or more operating characteristics of the vehicle into an access control model. Based on receiving a user input needed response from the access control model, the operations include obtaining from an operator of the vehicle one of an approval of the access request and a denial of the access request. Based on one of receiving a grant access request from the access control model and receiving the approval of the access request from the operator of the vehicle, the operations include granting the access request to the application. Based on one of receiving a deny access request from the access control model and receiving the denial of the access request from the operator of the vehicle, the operations include denying the access request to the application. The access request includes an identifier of the application and an identifier of a type of access being requested by the application.

As discussed above, modern vehicles are not equipped with systems for performing fin-grain access control to the various sensors of the vehicle by third-party applications installed on the vehicle processing system. Rather, currently available systems provide access control to devices, such as microphones, based on static preferences or settings that are configured by a user of an application. The user settings may be set during installation be manually modified by the user after installation.

In exemplary embodiments, methods, systems, and computer program products for context-aware fine-grained device access control for a vehicle are provided. The context-aware fine-grained device access control is configured to protect private personal data from being accessed by an application installed on the vehicle without the knowledge of the operator of the vehicle. In exemplary embodiments, the context-aware fine-grained device access control system is configured to regulate access to private personal data based on the context of the vehicle, which is determined based on the operating characteristics of the vehicle. The context-aware fine-grained device access control system is configured to continuously monitor device access requests, access requirements, and the state of systems, and applications of the vehicle and to responsively provide fine-grained control of the requested data access.

The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Referring now to FIG. 1, a vehicle processing system 100 is generally shown in accordance with one or more embodiments of the invention. The vehicle processing system 100 can be an electronic, computer framework comprising and/ or employing any number and combination of computing devices and networks utilizing various communication technologies, as described herein. The vehicle processing system 100 is disposed in a vehicle and is configured to control the operations of one more systems of the vehicle, such as an infotainment system, a heating and cooling system, and the like. The vehicle processing system 100 may be described in the general context of computer system executable instructions, such as program modules, being executed by a computer system. Generally, program modules may include routines, programs, objects, components, logic, data structures, and so on that perform particular tasks or implement particular abstract data types.

As shown in FIG. 1 the vehicle processing system 100 has one or more central processing units (CPU(s)) 101a, 101b, 101c, etc., (collectively or generically referred to as processor(s) 101). The processors 101 can be a single-core processor, multi-core processor, or any number of other configurations. The processors 101, also referred to as processing circuits, are coupled via a system bus 102 to a system memory 103 and various other components. The system memory 103 can include a read-only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the vehicle processing system 100. The RAM is read-write memory coupled to the system bus 102 for use by the processors 101. The system memory 103 provides temporary memory space for operations of said instructions during operation. The system memory 103 can include random access memory (RAM), read-only memory, flash memory, or any other suitable memory systems.

The computing system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software for execution on the vehicle processing system 100 may be stored in the mass storage 110. The software includes one or more applications 112 for execution on the vehicle processing system 100. In addition, the software includes an access control software (ACS) 111 that is configured to regulate the access of one or more applications 112 to information and/or sensors of the vehicle processing system 100. The mass storage 110 is an example of a tangible storage medium readable by the processors 101, where the software is stored as instructions for execution by the processors 101 to cause the computing system 100 to operate, such as is described herein below with respect to the various Figures. Examples of computer program products and the execution of such instruction are discussed herein in more detail. The communications adapter 107 interconnects the system bus 102 with a network 113, which may be an outside network, enabling the computing system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter and an interface adapter. In one embodiment, the adapters may be connected to one or more I/O buses that are connected to the system bus 102 via an intermediate bus bridge (not shown), A display 119 (e.g., a screen or a display monitor) is connected to the system bus 102 by the display adapter, which may include a graphics controller to improve the performance of graphics-intensive applications and a video controller. One or more sensors 121 and a user interface 115, can be interconnected to the system bus 102 via one or more adapters, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). The sensors 121 may include, but are not limited to, cameras, microphones, speedometers, accelerometers, global positioning sensors (GPS), and the like. Thus, as configured in FIG. 1, the vehicle processing system 100 includes processing capability in the form of the processors 101, storage capability including the system memory 103 and the mass storage 110, input means such as the user interface, and output capability including the display 119.

In some embodiments, the communications adapter 107 can transmit data using any suitable interface or protocol, such as the Internet small computer system interface, among others. The network 113 may be a cellular network, a radio network, a wide area network (WAN), a local area network (LAN), a personal area network (PAN), or the Internet, among others. An external computing device may connect to the vehicle processing system 100 through the network 113. In some examples, an external computing device may be a smartphone associated with an occupant or operator of the vehicle.

It is to be understood that the block diagram of FIG. 1 is not intended to indicate that the vehicle processing system 100 is to include all of the components shown in FIG. 1. Rather, the computing system 100 can include any appropriate fewer or additional components not illustrated in FIG. 1 (e.g., additional memory components, embedded controllers, modules, additional network interfaces, etc.). Further, the embodiments described herein with respect to vehicle processing system 100 may be implemented with any appropriate logic, wherein the logic, as referred to herein, can include any suitable hardware (e.g., a processor, an embedded controller, or an application-specific integrated circuit, among others), software (e.g., an application, among others), firmware, or any suitable combination of hardware, software, and firmware, in various embodiments.

Figure 2:
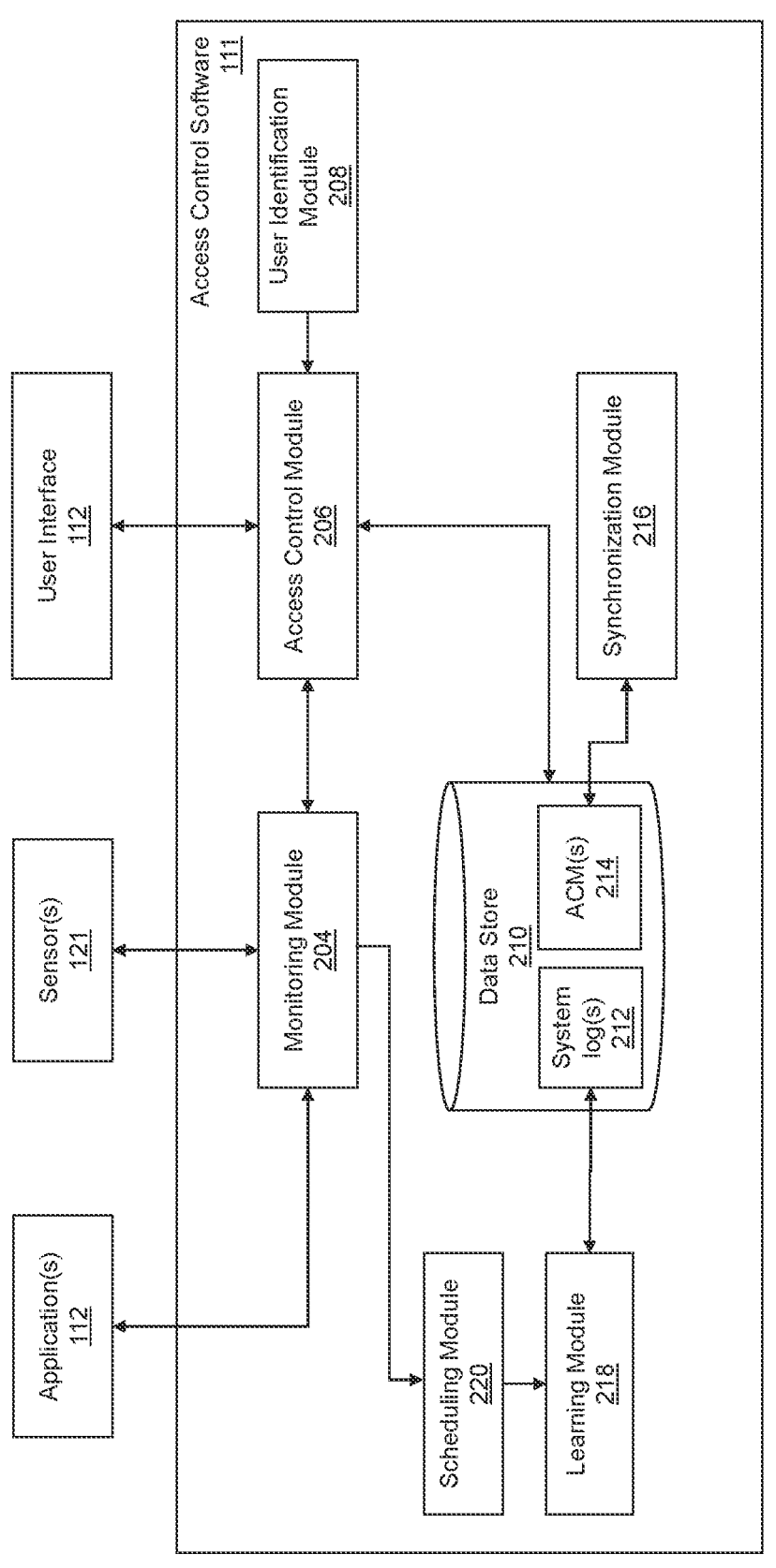
FIG. 2 illustrates a block diagram of access control software for a vehicle in accordance with an embodiment of the present invention.

Referring now to FIG. 2, a block diagram illustrating an access control software 111 for a vehicle in accordance with an embodiment of the present invention. As illustrated, the access control software 111 includes a monitoring module 204, an access control module 206, a user identification module 208, a data store 210, a synchronization module 216, a learning module 218, and a scheduling module 220. In general, the access control software 111 is configured to control the types of information and/or data that applications 112 can access based at least in part on one or more operating characteristics of the vehicle. In one embodiment, the access control software 111 is configured to regulate access by applications 112 to the one or more sensors 121 based in part on the operating characteristics of the vehicle. For example, an application may be granted access to a microphone or camera while the vehicle is operating at or above a threshold speed but may be denied access to the microphone or camera when the vehicle is operating below the threshold speed. In exemplary embodiments, the determination of whether to grant or deny an access request received from an application is based on an access control model (ACM) 214.

In exemplary embodiments, the monitoring module 204 is configured to intercept requests from applications 112 to access sensors 121 and/or data from other applications. The monitoring module 204 is also configured to monitor the operating characteristics of the vehicle, (e.g., whether the vehicle is running or stopped, a location of the vehicle, what applications are running on the vehicle processing system, and whether the applications are running in the foreground or background, etc.). In exemplary embodiments, the monitoring module 204 collects data from the applications 112 and sensors 121 and prepares the collected data for subsequent analysis.

In exemplary embodiments, the access control module 206 is configured to utilize an access control model (ACM) 214 to determine whether to grant or deny access requests generated by the applications 112. In addition, access control module 206 is configured to identify the ACM 214 that is used to evaluate the access requests. In one embodiment, the access control module 206 is configured to identify the ACM 214 based on the identity of the operator of the vehicle, which may be obtained from the user identification module 208. Once the identity of the operator of the vehicle is determined, the access control module 206 is configured to obtain an ACM 214 corresponding to the operator from the data store 210. In embodiments, where the identity of the operator is unknown, a default ACM 214 may be obtained and applied by the access control module 206. In one embodiment, where multiple ACMs 214 corresponding to the operator are saved in the data store 210, the most recently used ACM 214 may be obtained and applied by the access control module 206. Once the access control module 206 obtains the ACM 214 from the data store 210, the access control module 206 is configured to extract feature values or feature vectors from the sensors 121 or other locations in the vehicle processing system. The feature values are then applied to the ACM 214 to determine whether to grant or deny the access request.

In exemplary embodiments, the ACM 214 contains a set of rules that are used to grant or deny access requests based on user preferences that have been learned for the user. Each of the set of rules includes an access type, an identification of the application or application type, and one or more operating characteristics of the vehicle that are used to determine whether to grant or deny an access request. In exemplary embodiments, the access control module 206 is configured to interact with the operator of the vehicle, via the user interface 115 to receive guidance on access requests that either do not have an existing rule or for which the existing rule indicates that operator approval is needed for the access request. In addition, the access control module 206 is configured to update the rules of the ACM 214 based on input received from the operator of the vehicle via the user interface 115.

In exemplary embodiments, the user identification module 208 is configured to identify the operator and/or occupants of the vehicle. In one embodiment, the identity of the operator and/or occupants of the vehicle can be determined by utilizing one or more of facial recognition software and voice recognition software. In another embodiment, the identity of the operator and/or occupants of the vehicle can be determined based on detecting a smartphone or other device (e.g., a key fob) associated with an individual within the vehicle.

In exemplary embodiments, the synchronization module 216 is configured to communicate with one or more of an external user device, such as the smartphone of an operator of the vehicle, and an external computing system, such as a cloud computing system. In exemplary embodiments, the synchronization module 216 is configured to obtain an ACM 214 from the external user device or an external computing system and/or to save a copy of an ACM 214 in the external user device or an external computing system. For example, an ACM 214 of a user can be stored in the smartphone of a user in addition to the data store 210. Accordingly, when a user enters a new vehicle, the synchronization module 216 of the vehicle may obtain the ACM 214 from the user's smartphone and store the ACM 214 in the data store 210. Likewise, the synchronization module 216 is configured to transmit updates to an ACM 214 to a user's smartphone.

In exemplary embodiments, the data store 210 is configured to store one or more access control models (ACMs) 214 and one or more system logs 212. In exemplary embodiments, the system logs 212 include access requests that were made by applications 112, the operational characteristics of the vehicle at the time that the access requests were made, and an operator decision to allow or deny the access requests. The ACMs 214 stored by the data store 210 may correspond to a user or operator of the vehicle. In exemplary embodiments, the data store 210 may also include user-specified access control policies, one or more pretrained access control models, and access request decision logs that may be used during an audit of the performance of the access control software 111.

In exemplary embodiments, the learning module 218 is configured to train one or more ACMs 214 based on data obtained from the system logs 212. For example, the learning module 218 may be configured to obtain a model the model to create an ACM 214 based on the past decision history data obtained from the system logs 212. To train the ACM 214, the learning module 218 first obtains the historical data from the system logs 212 and pre-processes the data (e.g., data cleaning, dataset splitting, splitting the data into training data, validation data, and test data.) Next, after the data has been pre-processed, the learning module 218 is configured to perform model selection. For example, the data store 210 may include a plurality of models that may be used to perform multivariate decision-making, self-supervised, semi-supervised models, and the learning module 218 is configured to select one of the models. Once a model has been selected, feature extraction is performed on the data, so that the features are suitable for the input of the model. Next, the learning module 218 validates and tests the selected model to determine the performance of the model. Based on determining that the performance of the model exceeds threshold values, the trained model is stored as an ACM 214, which is used by the access control module 208.

In exemplary embodiments, the scheduling module 220 is configured to schedule the training and/or retraining of the ACMs 214. In general, the training and/or retraining of ACMs 214 is a computationally intensive task and the scheduling module 220 is configured to schedule the training and/or retraining of the ACMs 214 to save computing resources, mainly scheduling the start and stop of training model jobs. For example, it can be started at regular intervals, or when new data is generated up to a certain threshold, or when some policy changes, it can restart a training model.

Referring now to FIG. 3, a flowchart illustrating a method 300 for performing context-aware fine-grained device access control for a vehicle in accordance with one or more embodiments of the invention is shown. In exemplary embodiments, the method 300 is performed by access control software 111, as shown in FIGS. 1 and 2. The method 300 includes receiving an access request from an application installed on the vehicle. In exemplary embodiments, the access request includes a type of access that is being attempted and an identification of the application. In one embodiment, the type of access is one of microphone access, camera access, speedometer access, location access, and data access.

Next, as shown at block 304, the method 300 includes obtaining one or more operating characteristics of the vehicle. In exemplary embodiments, the one or more operating characteristics of the vehicle include the operating speed of the vehicle, the location of the vehicle, an identification of applications being executed on the vehicle, and a number of occupants of the vehicle. The method 300 also includes inputting the access request and the one or more operating characteristics of the vehicle into an access control model, as shown at block 306. In exemplary embodiments, the access control model is obtained from a data store and the access control model may be associated with the operator of the vehicle. In exemplary embodiments, the access control model is used to determine whether to grant or deny the access request. As shown at block 304, the method 300 includes receiving a response to the access request from the access control model. In exemplary embodiments, the response includes one or a grant request response, a deny request-response, or a user input needed response.

Based on a determination that the response from the access control model is a user input needed response, the method 300 includes obtaining, from an operator of the vehicle, one of an approval of the access request and a denial of the access request, as shown at block 310. Based on a determination that the response from the access control model is a grant access request or based on receiving approval of the access request from the operator of the vehicle, the method 300 includes granting the access request to the application, as shown at block 312. Based on a determination that the response from the access control model is a deny access request or based on receiving a denial of the access request from the operator of the vehicle, the method 300 includes denying the access request to the application, as shown at block 314. In exemplary embodiments, the access control model may be updated based on the response obtained from the operator of the vehicle to the requested access request.

Figure 4:
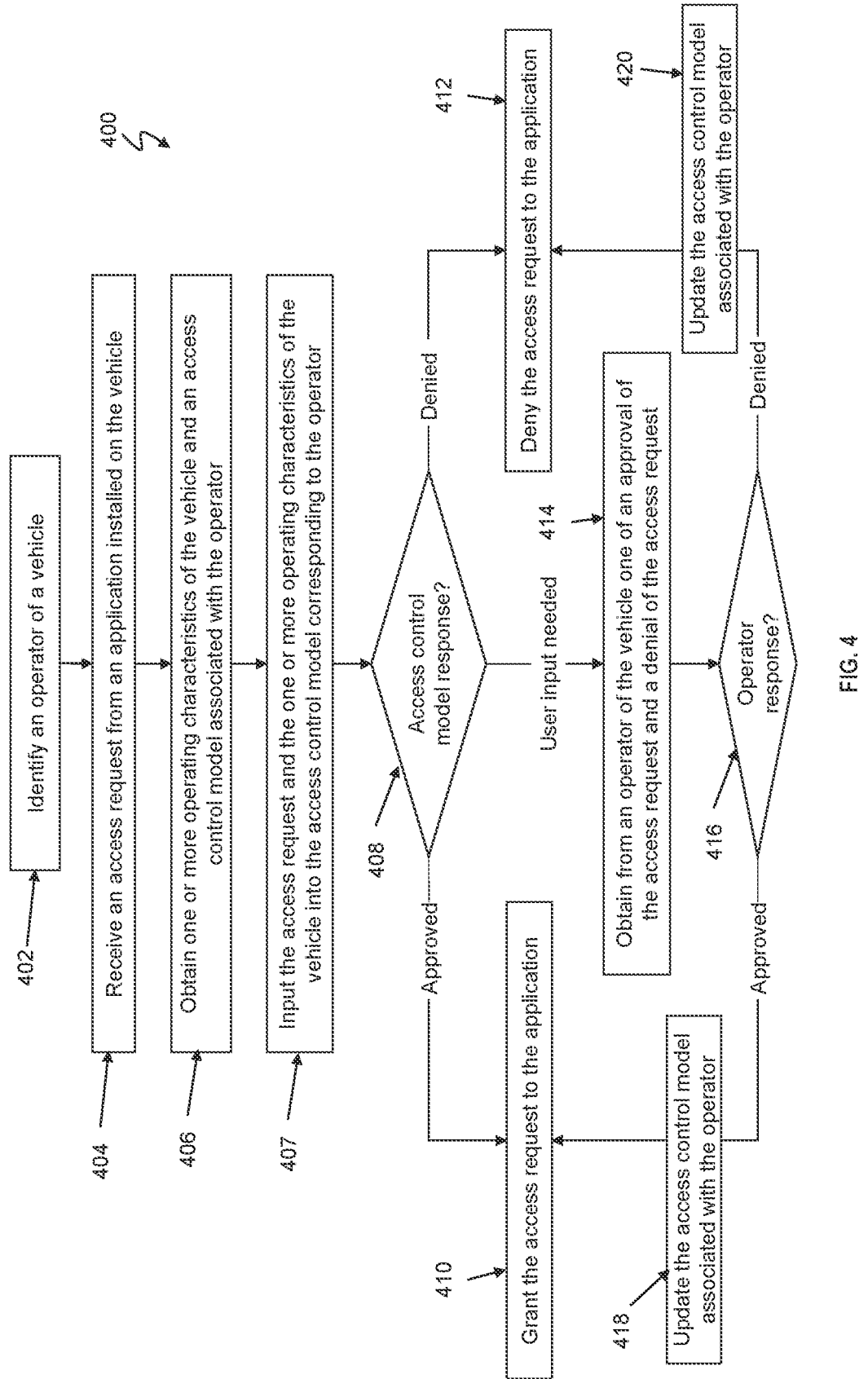
FIG. 4 illustrates a flow chart diagram of a method for context-aware fine-grained device access control for a vehicle in accordance with an embodiment of the present invention.

Referring now to FIG. 4, a flowchart illustrating a method 400 for performing context-aware fine-grained device access control for a vehicle in accordance with one or more embodiments of the invention is shown. In exemplary embodiments, the method 400 is performed by access control software 111, as shown in FIGS. 1 and 2. The method 400 includes identifying an operator of a vehicle. In exemplary embodiments, the operator of the vehicle is identified based on one of a facial recognition of the operator, a determination that a mobile device associated is located within the vehicle, and a determination that a key associated is located within the vehicle. Next, as shown at block 404, the method 400 includes receiving an access request from an application installed on the vehicle. In exemplary embodiments, the access request includes a type of access that is being attempted and an identification of the application. In one embodiment, the type of access is one of microphone access, camera access, speedometer access, location access, and data access.

Next, as shown at block 406, the method 400 includes obtaining one or more operating characteristics of the vehicle and an access control model associated with the operator. In exemplary embodiments, the one or more operating characteristics of the vehicle include the operating speed of the vehicle, the location of the vehicle, an identification of applications being executed on the vehicle, and the number of occupants of the vehicle. In exemplary embodiments, the one or more operating characteristics of the vehicle may also include the identity of the occupants of the vehicle, which may be determined using one or more of facial recognition or voice recognition. In one embodiment, the access control model is obtained from a data store based on the identity of the operator. The method 400 also includes inputting the access request and one or more operating characteristics of the vehicle into the access control model corresponding to the operator, as shown at block 407. At decision block 408, the method 400 includes identifying a type of response from the access control model. Based on a determination that the response from the access control model is an approval, the method 400 includes granting the access request to the application, as shown at block 410. Based on a determination that the response from the access control model is a denial, the method 400 includes denying the access request to the application, as shown at block 412.

Based on a determination that the response from the access control model is a user input needed response, the method 400 proceeds to block 414 and includes obtaining from an operator of the vehicle one of an approval of the access request and a denial of the access request. At decision block 416, the method 400 includes identifying a response from the operator of the vehicle to the access request. Based on a determination that the response from the operator of the vehicle to the access request is an approval, the method proceeds to block 418 and updates the access control model associated with the operator. Based on a determination that the response from the operator of the vehicle to the access request is a denial, the method proceeds to block 420 and updates the access control model associated with the operator.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 500 contains an example of an environment for the execution of at least some of the computer code involved in performing the inventive methods, such as context-aware fine-grained device access control for a vehicle, block 560. In addition to block 560, computing environment 500 includes, for example, computer 501, wide area network (WAN) 502, end user device (EUD) 503, remote server 504, public cloud 505, and private cloud 506. In this embodiment, computer 501 includes processor set 550 (including processing circuitry 520 and cache 521), communication fabric 511, volatile memory 552, persistent storage 553 (including operating system 522 and block 200, as identified above), peripheral device set 554 (including user interface (UI) device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

COMPUTER 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

PROCESSOR SET 550 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 550. Cache memories are typically organized into multiple levels depending upon relative proximity to the processing circuitry. Alternatively, some, or all, of the cache for the processor set may be located "off chip." In some computing environments, processor set 550 may be designed for working with qubits and performing quantum computing.

Computer-readable program instructions are typically loaded onto computer 501 to cause a series of operational steps to be performed by processor set 550 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 521 and the other storage media discussed below. The program instructions, and associated data, are accessed by processor set 550 to control and direct performance of the inventive methods. In computing environment 500, at least some of the instructions for performing the inventive methods may be stored in block 200 in persistent storage 553.

COMMUNICATION FABRIC 511 is the signal conduction path that allows the various components of computer 501 to communicate with each other. Typically, this fabric is made of switches and electrically conductive paths, such as the switches and electrically conductive paths that make up buses, bridges, physical input/output ports and the like.

Other types of signal communication paths may be used, such as fiber optic communication paths and/or wireless communication paths.

VOLATILE MEMORY 552 is any type of volatile memory now known or to be developed in the future. Examples include dynamic type random access memory (RAM) or static type RAM. Typically, volatile memory 552 is characterized by random access, but this is not required unless affirmatively indicated. In computer 501, the volatile memory 552 is located in a single package and is internal to computer 501, but, alternatively or additionally, the volatile memory may be distributed over multiple packages and/or located externally with respect to computer 501.

PERSISTENT STORAGE 553 is any form of non-volatile storage for computers that is now known or to be developed in the future. The non-volatility of this storage means that the stored data is maintained regardless of whether power is being supplied to computer 501 and/or directly to persistent storage 553. Persistent storage 553 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 554 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

NETWORK MODULE 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer-readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN 502 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

REMOTE SERVER 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

PUBLIC CLOUD 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

CLOUD COMPUTING SERVICES AND/OR MICRO-SERVICES (not separately shown in FIG. 5): private and public clouds 506 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

Various embodiments are described herein with reference to the related drawings. Alternative embodiments can be devised without departing from the scope of the present disclosure. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the present disclosure may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for context-aware fine-grained device access control for a vehicle, the method comprising:

receiving an access request from an application installed on the vehicle;

obtaining one or more operating characteristics of the vehicle;

identifying an operator of the vehicle;

responsive to identifying the operator, obtaining, from a mobile device associated with the operator, an access control model corresponding to the operator and storing the access control model in a data store of the vehicle;

inputting the access request and the one or more operating characteristics of the vehicle into an access control model corresponding to the operator obtained from the mobile device;

based on receiving a user input needed response from the access control model, obtaining from an operator of the vehicle one of an approval of the access request and a denial of the access request;

based on one of receiving a grant access request from the access control model and receiving the approval of the access request from the operator of the vehicle, granting the access request to the application; and based on one of receiving a deny access request from the access control model and receiving the denial of the access request from the operator of the vehicle, denying the access request to the application, wherein the access request includes an identifier of the application and an identifier of a type of access being requested by the application, wherein the context-aware fine-grained device access control is performed by access control software installed on a vehicle processing system disposed in the vehicle, and wherein the type of access is one of a microphone access, a camera access, a speedometer access, a location access, and a data access.

2. The computer-implemented method of claim 1, wherein the operator of the vehicle is identified based on one of a facial recognition of the operator, a determination that a mobile device associated is located within the vehicle, and a determination that a key associated is located within the vehicle.

3. The computer-implemented method of claim 1, further comprising updating the access control model based on receiving the one of the approval of the access request and the denial of the access request.

4. The computer-implemented method of claim 3, further comprising storing the updated access control model on one or more of a memory disposed in the vehicle and a mobile device associated with the operator.

5. The computer-implemented method of claim 1, wherein the one or more operating characteristics of the vehicle include an operating speed of the vehicle, a location of the vehicle, and a number of occupants of the vehicle.

6. A computing system having a memory having computer readable instructions and one or more processors for executing the computer readable instructions, the computer readable instructions controlling the one or more processors to perform operations comprising:

receiving an access request from an application installed on a vehicle;

obtaining one or more operating characteristics of the vehicle;

identifying an operator of the vehicle;

responsive to identifying the operator, obtaining, from a mobile device associated with the operator, an access control model corresponding to the operator and storing the access control model in a data store of the vehicle inputting the access request and the one or more operating characteristics of the vehicle into an access control model corresponding to the operator obtained from the mobile device;

based on receiving a user input needed response from the access control model, obtaining from an operator of the vehicle one of an approval of the access request and a denial of the access request;

based on one of receiving a grant access request from the access control model and receiving the approval of the access request from the operator of the vehicle, granting the access request to the application; and based on one of receiving a deny access request from the access control model and receiving the denial of the access request from the operator of the vehicle, denying the access request to the application, wherein the access request includes an identifier of the application and an identifier of a type of access being requested by the application, wherein the context-aware fine-grained device access control is performed by access control software installed on a vehicle processing system disposed in the vehicle, and wherein the type of access is one of a microphone access, a camera access, a speedometer access, a location access, and a data access.

7. The computing system of claim 6 wherein the operator of the vehicle is identified based on one of a facial recognition of the operator, a determination that a mobile device associated is located within the vehicle, and a determination that a key associated is located within the vehicle.

8. The computing system of claim 6, wherein the operations further comprise updating the access control model based on receiving the one of the approval of the access request and the denial of the access request.

9. The computing system of claim 8, wherein the operations further comprise storing the updated access control model on one or more of a memory disposed in the vehicle and a mobile device associated with the operator.

10. The computing system of claim 6, wherein the one or more operating characteristics of the vehicle include an operating speed of the vehicle, a location of the vehicle, and a number of occupants of the vehicle.

11. A computer program product comprising a computer readable storage medium having program instructions embodied therewith, the program instructions executable by a processor to cause the processor to perform operations comprising:

receiving an access request from an application installed on a vehicle;

obtaining one or more operating characteristics of the vehicle;

identifying an operator of the vehicle;

responsive to identifying the operator, obtaining, from a mobile device associated with the operator, an access control model corresponding to the operator and storing the access control model in a data store of the vehicle inputting the access request and the one or more operating characteristics of the vehicle into an access control model corresponding to the operator obtained from the mobile device;

based on receiving a user input needed response from the access control model, obtaining from an operator of the vehicle one of an approval of the access request and a denial of the access request;

based on one of receiving a grant access request from the access control model and receiving the approval of the access request from the operator of the vehicle, granting the access request to the application; and based on one of receiving a deny access request from the access control model and receiving the denial of the access request from the operator of the vehicle, denying the access request to the application, wherein the access request includes an identifier of the application and an identifier of a type of access being requested by the application, wherein the context-aware fine-grained device access control is performed by access control software installed on a vehicle processing system disposed in the vehicle, and wherein the type of access is one of a microphone access, a camera access, a speedometer access, a location access, and a data access.

12. The computer program product of claim 11, wherein the operator of the vehicle is identified based on one of a facial recognition of the operator, a determination that a mobile device associated is located within the vehicle, and a determination that a key associated is located within the vehicle.

13. The computer program product of claim 11, wherein the operations further comprise updating the access control model based on receiving the one of the approval of the access request and the denial of the access request.

14. The computer program product of claim 13, wherein the operations further comprise storing the updated access control model on one or more of a memory disposed in the vehicle and a mobile device associated with the operator.

15. The computer program product of claim 11, wherein the one or more operating characteristics of the vehicle include an operating speed of the vehicle, a location of the vehicle, and a number of occupants of the vehicle.

* * * * *